Nov. 10, 1936.  F. W. HECKERT  2,060,209
FUEL PUMP FOR AIRCRAFT ENGINES
Filed March 7, 1935
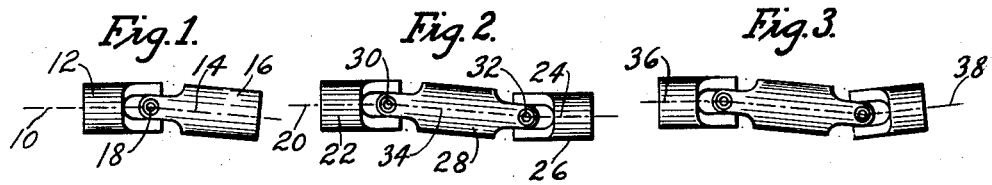
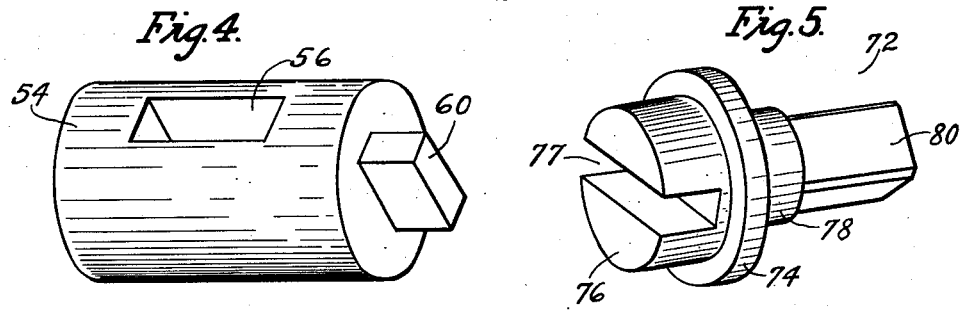
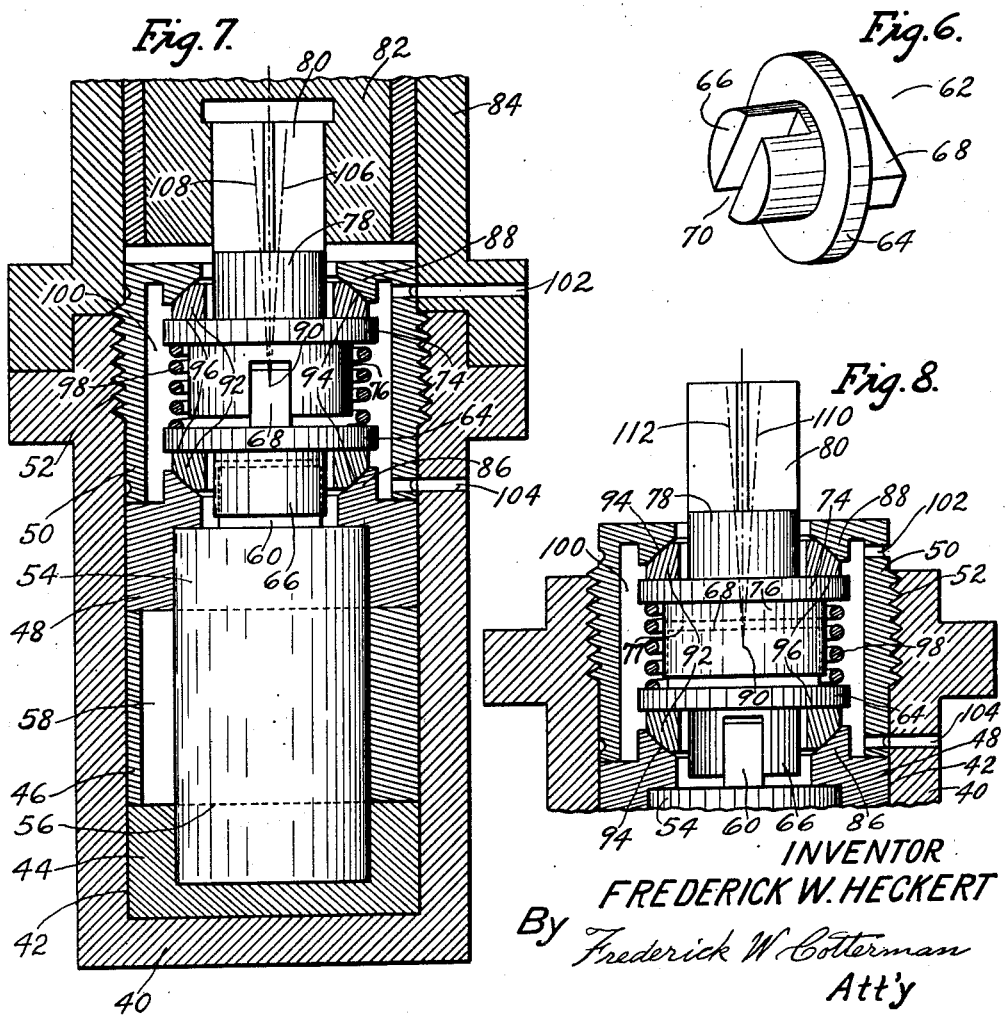
INVENTOR
FREDERICK W. HECKERT
By Frederick W. Cotterman
Att'y Patented Nov. 10, 1936

2,060,209

UNITED STATES PATENT OFFICE 2,060,209

FUEL PUMP FOR AIRCRAFT ENGINES

Frederick W. Heckert, Oakwood, Ohio

Application March 7, 1935, Serial No. 9,800

4 Claims. (Cl. 286—7)

This invention relates to fuel pumps for aircraft engines and has particular reference to a means for drivably connecting the pump to the engine and sealing against leakage from both the pump and engine shafts.

Pumps of this character are preferably made so as to be readily attached to or detached from the engine in order that repairs may be made more expeditiously.

It is often the case that when pumps are so attached there is a misalignment of the axes of the pump shaft and the engine shaft to which the pump is connected, resulting in a binding action on the several bearings which is destructive to the rotating elements, particularly the pump parts.

This misalignment between the engine and pump shafts may be such that the shafts are substantially coaxial except for a bend in the axis where the shafts join, or, the axes of the two shafts may be parallel but offset, while in still other cases the axes may be both offset and at an angle to each other.

It is therefore an object of this invention to provide a simple, compact and effective coupling which will permit considerable misalignment of the shaft axes, angular, offset, or both, without affecting the efficiency of the drive.

As is well known in the art, the bearing thru which the rotatable element of a pump extends for connection to a driving member is prone to leakage, and usually requires some sort of seal or stuffing box to keep it leak-tight.

In the operation of the embodiment herein disclosed it is not only desirable to prevent escape and consequent loss of the liquid fuel being pumped, but it is highly desirable to prevent a transfer of the liquid from the pump to the interior of the engine, where it has the effect of diluting the lubricating oil. It is also desirable to prevent a transfer of gritty, used lubricating oil, which comes from the end of the engine bearing, to the interior of the pump where it may injure the fine finish and extreme accuracy of a pump rotor of the type shown.

It is therefore a further object of this invention to provide a simple and effective seal associated with the coupling between the engine and the pump which will prevent a transfer of fuel or oil from the pump to the engine or from the engine to the pump even when operating with the axes of their respective shafts misaligned angularly, offset, or both.

Other objects and meritorious features will become apparent from a consideration of the detailed description, reference being had to the drawing, wherein, Fig. 1 shows a single universal joint as it operates when the driving and driven members are substantially coaxial except for a bend in the axis where the two members join.

Fig. 2 shows a double universal joint as it operates when the driving and driven members have their axes parallel but offset with each other.

Fig. 3 shows a double universal joint as it operates when the driving and driven members have their axes both offset and at an angle.

Fig. 4 is a perspective view of the pump rotor or driven element of the device.

Fig. 5 is a perspective view of the drive shaft.

Fig. 6 is a perspective view of the single coupling member which connects the drive shaft and pump rotor.

Fig. 7 is an axial section thru the pump and coupling, the pump rotor, drive shaft, and coupling members being shown in full view.

Fig. 8 is a partial view similar to Fig. 7 except that the drive shaft, coupling member, and rotor have been rotated one quarter revolution.

Similar numerals refer to similar parts thruout the several views.

Figs. 1, 2, and 3 form no part of the present invention but are shown merely as examples of the several kinds of misalignment which a universal joint is called upon to counteract.

In Fig. 1, the axis 10 of the driven member 12, and the axis 14 of the driving member 16 meet at 18. This angular misalignment is the only misalignment which may be permitted when only a single joint as in Fig. 1 is employed.

In Fig. 2 the axis 20 of the driven member 22 and the axis 24 of the driving member 26 are parallel but offset from each other. A double universal joint is employed having the coupling member 28 joining to the driving and driven members at 30 and 32. The axis 34 of the coupling member 28 is, of course, at an angle to the axes of the driving and driven members.

In Fig. 3 the double universal shown in Fig. 2 is again used, but here the axis 38 of the driving member is not only offset with respect to the axis 36 of the driven member but is also at an angle thereto. Each of the three kinds of misalignment shown in Figs. 1 to 3 is permissible in the embodiment of the invention herein disclosed.

The pump body 40 has a smooth cylindrical opening 42 to receive the rear rotor bearing 44, the eccentrically bored pump liner 46 and the front rotor bearing 48. A hollow binding nut 50 is threaded at 52 into the body 40 clamping the parts 44, 46, and 48 together.

The rotor 54 (see Fig. 4) is slotted at 56 for the rotor blade 58. The outer end of the rotor has integral therewith the flattened driving tongue 60. The coupling member 62 (see Fig. 6) comprises a flange 64 having a hub 66 on one side and a flattened driving tongue 68 on the other. The hub 66 is slotted at 70 and this slot fits slidably over the rotor tongue 60.

The drive shaft 72 (see Fig. 5) comprises a flange 74 having a hub 76 on one face and a smaller hub 78 on the other. Adjacent to smaller hub 78 is the square shank 80 which fits closely but slidably into a corresponding hole in the shaft 82 of the engine 84. The hub 76 is slotted at 77 and this slot fits slidably over the tongue 68 of the coupling member 62.

The end of the front rotor bearing 48 carries the hub 86, and the inner face of the binding nut 50 has a similar hub 88. The faces of the hubs 86 and 88 are of spherical contour, the center of the sphere being at 90. The washers 92 each have one spherical face accurately fitted to the faces of the hubs as at 94 and a flat face in contact with the flanges 64 and 74 at 96. A spring 98 acts in both directions to keep the joints 94 and 96 in close engagement.

It will be noted that the interior of the binding nut 50 is considerably larger than the outer diameter of the flanges 64 and 74 so that a chamber 100 is provided. Drain holes 102 and 104 extend from this chamber to the outside. These holes are so located that in the views shown the hole 104 is lower than the upper end of the hub 86 so that liquid flowing down the sides of the chamber 100 will flow out of the hole 104 before it accumulates sufficiently to reach the level of the top of the hub 86.

Similarly when the pump, instead of being mounted as shown, is mounted topside downward, the drain hole 102 will be lower than the top of the hub 88, thereby preventing any fluid which has escaped and is flowing down the sides of the chamber 100 from accumulating sufficiently to reach the level of the top of the hub 88 as it otherwise would when thus inverted. In places where fluid drip might be hazardous a tube may be used to carry the drip to a point some distance from the engine.

By reference to the drawing it will be seen that the hub 78 of the drive shaft 72, and the hub 66 of the coupling member 62 both extend thru considerably enlarged holes in the members thru which they pass so as to provide space for considerable universal action.

Where a vane type pump such as is herein shown is employed, it is of prime importance that there be no binding action on the rotor either on its diameter or on its ends, for if there be such binding action, the life of the pump is extremely short, since the rotor makes but a line contact with the eccentrically bored pump liner 46, and there is no adjustment for wear. But where the rotor is yieldingly driven, as in the embodiment shown, there is very little wear at this point, and a long life may safely be expected.

By reference to Figs. 7 and 8 it will be seen that the angular, offset, and combined angular and offset drives shown in Figs. 1 to 3 are all provided for in the embodiment of the invention shown. If in Fig. 7, the shank 80 were moved at an angle only about the center 90, as for instance if the axis of the shank 80 were moved from the line 106 to the line 108, movement of the tongue 60 in the slot 70 of the hub 66 would take place while the spherical surfaces 94 of both washers would move in their seats.

On the other hand, if the shank were revolved one quarter turn as in Fig. 8 and then the center line of the shank were moved about the point 90 from the line 110 to the line 112, movement of the slot 77 of the hub 76 would take place over the tongue 68 while the spherical surfaces 94 of the upper washer only would move in its seat. In both cases the spherical washers remain concentric with the flanges 64 and 74.

If a drive as in Fig. 2, is required, the spherical washers do not move in their spherical seats but remain as in Figs. 7 and 8, while the flanges 64 and 74 shift transversely with respect to the washers 92 by relative movement of the flat surfaces at 96.

Where a drive as in Fig. 3 is required, spherical movement of the washers 92 with respect to the hubs 86 and 88 as well as transverse movement with respect to the flanges 64 and 74 takes place simultaneously. These movements are all permitted without at any time breaking the seal at either end of the chamber 100 either at the joints 94 or 96. It is, of course, understood that in most instances the misalignment of the drive shaft and rotor which the device herein shown is called upon to compensate for is merely the small amount due to the inaccuracy of workmanship.

It should here be noted that regardless of whether the drive is similar to Figs. 1, 2, or 3, it is accomplished with no backlash inasmuch as the tongues 60 and 68 fit their respective slots 70 and 77 slidably but closely. This is highly important for the reason that the resistance of the pump rotor is pulsating and if there is the slightest backlash it results in an objectionable chatter in the drive.

While I have herein described as one embodiment of my invention, a rotary fuel pump with my improved features, it will be understood that the improvements embodied are readily adaptable to many other forms of compressors, fluid motors, and the like. With this view of the scope of the invention,

I claim,

1. In combination, a drive shaft extending loosely thru one end of a non-rotatable casing, a rotatable pumping element extending loosely through the other end of said non-rotatable casing, means holding said casing ends substantially in axial alignment, said casing ends having spherical surfaces facing each other, washers having spherical faces fitted to the spherical surfaces of the casing ends and flat faces facing each other, two flanges, one against each of said flat faces, one flange being secured to the drive shaft, means resiliently holding said flanges against said flat faces, a tongue and slot connection joining said flanges for guiding the one in a straight line in a transverse movement with respect to the other, and a second tongue and slot connection rotatably displaced ninety degrees from the first, joining the other flange to the rotatable pumping element for guiding the said other flange in a straight line in a transverse movement with respect to the said rotatable pumping element.

2. In combination, a drive shaft extending loosely thru one end of a non-rotatable casing, a rotatable element extending loosely thru the other end of said non-rotatable casing, means holding said casing ends substantially in axial alignment, said casing ends having spherical surfaces facing each other, washers having spherical faces fitted to the spherical surfaces of the casing ends and flat faces facing each other, a flange on the drive shaft against the flat face of one washer, a second flange against the flat face of the other said washer, means interposed between said flanges resiliently holding said flanges against said flat faces, a driving means joining said flanges, said driving means having a straight line transversely movable joint between said flanges, and a second driving means joining the second flange to the rotatable element, said second driving means having a straight line transversely movable joint between the said second flange and the rotatable elements.

3. In combination, a structure having two spaced apart ends having spherical surfaces with a common center facing each other, a driving member extending loosely thru one end into the space between the two said ends, a driven member extending loosely thru the other end into the space between the two said ends, a coupling member between the driving and driven members, slidably fitted guiding means on the driving and coupling members for guiding the one in a transverse movement with respect to the other, slidably fitted guiding means on the driven and coupling members for guiding the one in a transverse movement at right angles to the first said transverse movement, a flange on the driving member, a second flange on the coupling member, washers each having a flat face in contact with one of said flanges and a spherical face in contact with one of said spherical surfaces, and a resilient means urging the flanges against the said washers and the washers against the said ends.

4. In combination, a structure having two spaced apart ends having spherical surfaces facing each other, a driving member extending loosely thru one end into the space between the two said ends, a driven member extending loosely thru the other end into the space between the two said ends, a coupling member drivably connecting the driving and driven members, slidably fitted guiding means on the driving and coupling members for guiding the one in a straight line movement with respect to the other, said straight line extending thru the axis of rotation transversely thereof, slidably fitted guiding means on the driven and coupling members for guiding the one in a straight line movement with respect to the other, said straight line extending thru the axis of rotation transversely thereof and ninety degrees of rotation from the first said straight line, a flange on the driving member, a second flange on the coupling member, washers each having a flat face in contact with one of said flanges and a spherical face in contact with one of said spherical surfaces, and a resilient means urging the flanges against the said washers, and the washers against the said ends.

FREDERICK W. HECKERT.